Jan. 7, 1936.   G. B. RANDOLPH   2,027,289
LAWN TRIMMER
Filed Oct. 22, 1934
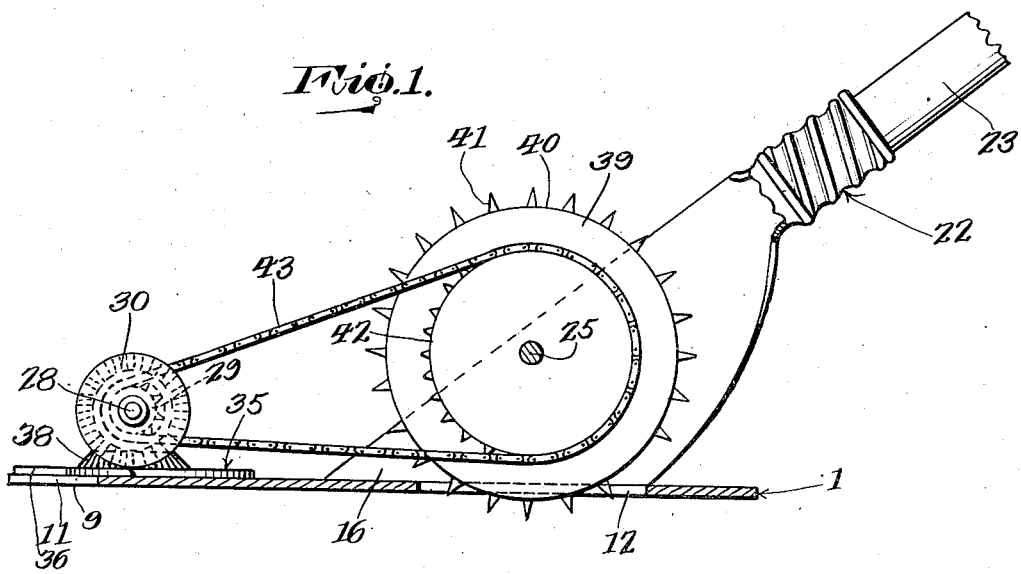
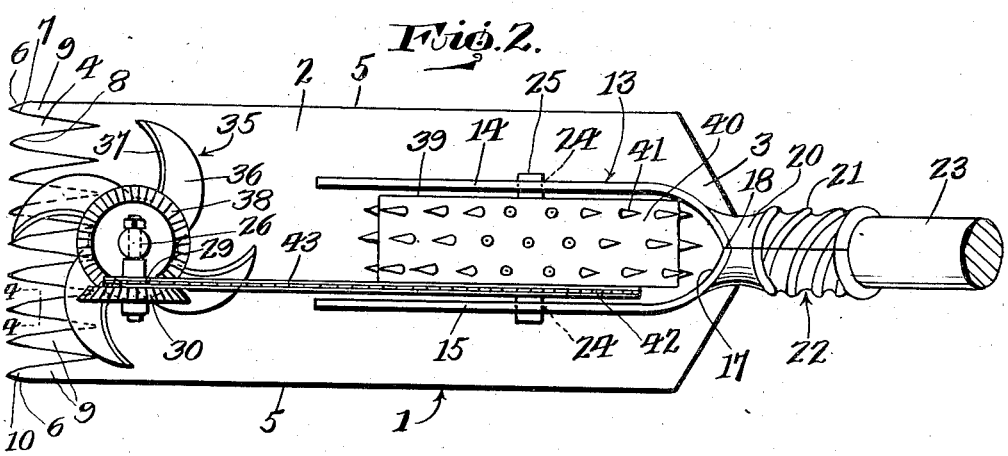
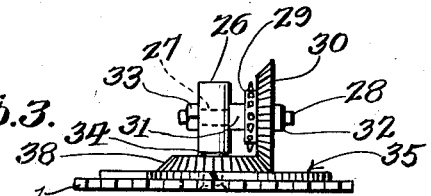
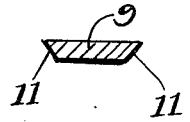
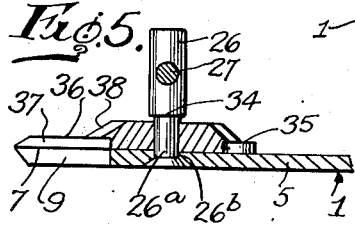
Inventor
George B. Randolph
By Geo. P. Kimmel
Attorney Patented Jan. 7, 1936

2,027,289

UNITED STATES PATENT OFFICE 2,027,289

LAWN TRIMMER

George B. Randolph, San Antonio, Tex.

Application October 22, 1934, Serial No. 749,446

8 Claims. (Cl. 56—255)

This invention relates to a lawn trimmer and has for its object to provide, in a manner as hereinafter set forth a mobile device of the class referred to for expeditiously and satisfactorily trimming a lawn when desired.

Further objects of the invention are to provide, in a manner as hereinafter set forth a lawn trimmer which is simple in its construction and arrangement, strong, durable, compact, thoroughly efficient in its use, readily repaired when required, having the driven parts so arranged and set up that when one becomes damaged it may be expeditiously removed and a new part substituted overcoming the necessity of discarding the entire device, and comparatively inexpensive to manufacture.

To the above ends essentially, and to others which may hereinafter appear, the invention consists of such parts, and such combination of parts which fall within the scope of the invention as claimed.

In the drawing:

Figure 1 is a longitudinal sectional view of the lawn trimmer,

Figure 2 is a top plan view thereof,

Figure 3 is a detail illustrating the operating means for the cutter element,

Figure 4 is a section on line 4—4, Figure 2, and

Figure 5 is a section on line 5—5 Figure 2.

The lawn trimmer includes a flat base plate 1 for sliding in superimposed relation with respect to the grass. The plate 1 is formed with a rectangular part 2 and a tapered part 3 into which merges the rear end of part 2. The latter is of the desired width and length and of a length materially greater than part 3. The forward portion of part 2 is formed with a transverse row of spaced parallel substantially V-shaped cutouts 4 extending lengthwise of part 2 from its forward edge thereof. The forward ends of the side edges 5 of the part 2 are extended inwardly at an inclination as indicated at 6. The forward ends of the walls of each cutout 4 are extended at opposite inclinations as indicated at 7, 8. The cutouts 4 provide the forward end terminal portion of part 2 with tapered teeth 9. The inclining of the side edge 5 and the walls of the cutouts in the manner as referred to provides the teeth 9 with pointed outer end terminal portions 10. The walls of the cutouts are beveled to provide the teeth 9 with cutting edges 11. The plate 1 is formed with a rectangular opening 12 intersected centrally by the longitudinal median of part 2 and which is arranged between the transverse median and rear end of the said part 2.

Secured upon the part 2 of plate 1, and extending rearwardly at an upward inclination with respect to the said part 2 is a combined support and coupling structure 13 formed of a pair of upstanding oppositely disposed sections 14, 15 of like form, having the major portion of the length thereof arranged in parallel spaced relation.

The section 14 or the section 15 of structure 13 includes a substantially triangular shaped forward portion 16 secured upon part 2 of plate 1 in proximity to and of greater length than that of a side wall of opening 12. Each section also includes a rear portion 17. The portion 16 extends forwardly of and rearwardly from the opening 12, gradually increases in height from its forward to its rear end and merges at its rear end into the forward end of the rear portion 17. The portion 17 extends inwardly and upwardly with respect to portion 16, gradually decreases in width from its forward to its rear end 18 and is disposed upon an outwardly directed curve. The portion 17 at its rear merges into the forward end of a rearwardly extending upwardly inclined semi-cylindrical portion 20 having a part of its length threaded as at 21.

The lengthwise edges of the portion 20 of one section are secured to the lengthwise edges of the portion 20 of the other section to form a threaded sleeve 22 for coupling a handle member 23 to the structure 13. The portions 16 of the sections 14, 15 are formed with aligning openings 24 in which the ends of a combined drive and traction wheel carrying shaft 25 are journaled.

The constructing of the structure 13 in the manner as stated provides it with a forward combined coupling and supporting part of yoke shape contour respectively for plate 1 and shaft 25 and a rear coupling part for the handle member 23.

Anchored to the plate 1 in proximity to and rearwardly of the base of the teeth 9 is a vertically disposed post 26, provided near its upper end with an opening 27 extending diametrically thereof for the passage of a short supporting shaft 28 disposed at right angles to post 26. Revolubly mounted on shaft 28 adjacent post 26 is a sprocket wheel 29 and a beveled gear 30. Interposed between sprocket wheel 29 and post 26 and mounted on shaft 28 is a spacing collar 31. The sprocket wheel 29 and gear 30 are secured together for revolving in unison about shaft 28. A retaining means 32 is carried by shaft 28 for gear 30. A retaining nut 33 is mounted on shaft 28 and abuts post 26. The collar 31, means 32 and nut 33 prevents the lengthwise shifting of shaft 28 with respect to post 26. The latter is formed with a reduced lower portion 26ª. The junction of the enlarged upper portion of post 26 with the lower portion of the latter provides post 26 with a shoulder 34. The portion 26ª of the post 26 extends through an opening 26ᵇ in plate 1. The lower end of portion 26ª is upset, countersunk in and anchored to plate 1. Positioned upon the upper face of plate 1, revolving around the reduced portion of post 26 and extending substantially to the forward end of part 2 is a horizontally disposed flat circular cutter element 35, formed with a series of radially disposed curved blades 36 having beveled cutting edges 37. Secured upon the element 35, bodily revolved therewith and around the reduced portion of post 26 is a beveled gear 38 which opposes and is spaced from shoulder 34. The gear 38 is of materially less diameter than that of element 35 and meshes with the gear 30 so as to be driven therefrom to provide for the revolving of element 35.

Carried by and anchored to shaft 25 is a solid circular member forming a traction wheel 39 having a wide tread 40. Disposed throughout the tread 40 of wheel 39 are rows of spaced ground grippers 41. The wheel is arranged within the yoke shaped portion of structure 13, extends above the latter and depends through slot 12. Fixedly secured to one side of the wheel 39 is a sprocket wheel 42. Travelling around the latter and the sprocket wheel 29 is an endless belt 43, of the link type for transmitting motion from the wheel 39 to the sprocket wheel 29, whereby the gears 30 and 38 will coact to provide for the revolving of the element 35, so as to have the latter to act, in connection with the teeth 9 to cut off the grass or weeds extended up through the cutouts 4, when the plate 1 is to slide along the grass.

The cutouts 4 provide the forward end of plate 1 of comb-like contour.

What I claim is:

1. A mobile lawn trimmer comprising a flat plate for sliding in superimposed relation over the lawn to be trimmed, said plate provided intermediate its ends with an opening having its forward end cut out lengthwise thereof to provide it with a transverse row of spaced teeth formed with cutting edges, a traction wheel extending through the opening in said plate and spaced rearwardly from said teeth, means carried by the plate for rotatably supporting said wheel, a ratchet wheel on one side of said traction wheel, a horizontally disposed revoluble cutter element positioned in superimposed relation upon said plate forwardly of the traction wheel and being formed with cutting blades travelling in superimposed relation over said teeth, operating means for said cutter element fixed thereon, a post carried by the plate and provided with means forming a shaft and retainer for said element and operating means, driven means supported in lateral relation to said post for driving said operating means, and an endless power transmitting belt connecting said driven means to said sprocket wheel to provide for the operation of said driven means on the rotation of said traction wheel.

2. A mobile lawn trimmer comprising a flat plate for sliding in superimposed relation over the lawn to be trimmed, said plate being cut out at its forward end to provide it with a transverse row of spaced teeth formed with cutting edges, said plate rearwardly of said teeth being formed with an opening extending lengthwise thereof, a traction wheel extending through said opening, means carried by the plate for rotatably supporting said wheel, a revoluble cutter structure arranged in superimposed relation upon said plate, the axis of said structure being arranged rearwardly adjacent to the inner ends of said teeth, said structure being provided with cutting blades travelling in superimposed relation over said teeth, a sprocket wheel driven from said traction wheel, and an endless power transmitting belt driven from said sprocket wheel and having an operative driven connection with and for revolving said structure.

3. A mobile lawn trimmer comprising a flat plate for sliding in superimposed relation over the lawn to be trimmed, said plate being cut out at its forward end to provide it with a transverse row of spaced teeth formed with cutting edges, said plate rearwardly of said teeth being formed with an opening extending lengthwise thereof, a traction wheel extending through said opening, means carried by the plate for rotatably supporting said wheel, a revoluble cutter structure arranged in superimposed relation upon said plate, the axis of said structure being arranged rearwardly adjacent to the inner ends of said teeth, said structure being provided with cutting blades travelling in superimposed relation over said teeth, a sprocket wheel driven from said traction wheel, an endless power transmitting belt driven from said sprocket wheel and having an operative driving connection with and for revolving said structure, and said wheel provided throughout its tread surface with spaced ground grippers.

4. A mobile lawn trimmer comprising a flat rectangular plate for sliding in superimposed relation over the lawn to be trimmed, said plate being cut out lengthwise of its forward end to provide it with a transverse row of spaced teeth formed with cutting edges, said plate being provided rearwardly of said teeth and adjacent its rear end and sides with an opening extending lengthwise thereof, a traction wheel extending through said opening, means at the sides of said opening for rotatably supporting said wheel, said means being extended rearwardly from said plate to provide a pusher for the trimmer, a revoluble cutter structure arranged in superimposed relation upon said plate, the axis of said structure being arranged rearwardly adjacent the inner ends of said teeth, said structure being provided with cutting blades travelling in superimposed relation over said teeth, a sprocket wheel driven from said traction wheel, and an endless power transmitting belt driven from said sprocket wheel and having an operative driven connection with and for revolving said structure.

5. A mobile lawn trimmer comprising a flat rectangular plate for sliding in superimposed relation over the lawn to be trimmed, said plate being cut out lengthwise of its forward end to provide it with a transverse row of spaced teeth formed with cutting edges, said plate being provided rearwardly of said teeth and adjacent its rear end and sides with an opening extending lengthwise thereof, a traction wheel extending through said opening, means at the sides of said opening for rotatably supporting said wheel, said means being extended rearwardly from said plate to provide a pusher for the trimmer, a revoluble cutter structure arranged in superimposed relation upon said plate, the axis of said structure being arranged rearwardly adjacent the inner ends of said teeth, said structure being provided with cutting blades travelling in superimposed relation over said teeth, a sprocket wheel driven from said traction wheel for revolving said structure, and said traction wheel, an endless power transmitting belt driven from said sprocket wheel and having an operative driving connection with and provided throughout its tread surface with spaced ground grippers.

6. A mobile lawn trimmer comprising a flat plate for sliding in superimposed relation over the lawn to be trimmed, said plate being cut out at its forward end to provide it with a transverse row of spaced teeth formed with cutting edges, said plate rearwardly of said teeth being formed with an opening extending lengthwise thereof, a traction wheel extending through said opening, means carried by the plate for rotatably supporting said wheel, a post fixed to the upper face of said plate rearwardly of said teeth and having its lower portion reduced, a cutter structure mounted in superimposed relation upon said plate, revoluble about said portion and retained against the plate by said post, said structure including cutting blades travelling in superimposed relation over said teeth and a gear, a shaft anchored to and disposed at right angles to said post, operating means for said gear carried by said shaft, and an endless power transmitting element operated from said wheel for driving said operating means, said wheel being provided with a driving connection for said element and said operating means including a driven part operated from said element.

7. A mobile lawn trimmer comprising a flat plate for sliding in superimposed relation over the lawn to be trimmed, said plate being cut out at its forward end to provide it with a transverse row of spaced teeth formed with cutting edges, said plate rearwardly of said teeth being formed with an opening extending lengthwise thereof, a traction wheel extending through said opening, means carried by the plate for rotatably supporting said wheel, a post fixed to the upper face of said plate rearwardly of said teeth and having its lower portion reduced, a cutter structure mounted in superimposed relation upon said plate, revoluble about said portion and retained against the plate by said post, said structure including cutting blades travelling in superimposed relation over said teeth and a gear upon and secured to said blades, a shaft anchored to and disposed at right angles to said post, operating means for said gear carried by said shaft, an endless power transmitting element operated from said wheel for driving said operating means, said wheel being provided with a driving connection for said element and said operating means including a driven part operated from said element, and said wheel part provided throughout its tread surface with spaced ground grippers.

8. A mobile lawn trimmer comprising a flat rectangular plate for sliding in superimposed relation over the lawn to be trimmed, said plate being cut out lengthwise of its forward end to provide it with a transverse row of spaced teeth formed with cutting edges, said plate being provided rearwardly of said teeth and adjacent its rear end and sides with an opening extending lengthwise thereof, a traction wheel extending through said opening, upstanding means secured to said plate at the sides of said opening for rotatably supporting said wheel, said means extending rearwardly from said plate, a handle connected to the rear end of said means, a revoluble cutter structure arranged in superimposed relation upon said plate and including a driven part, the axis of said structure being arranged rearwardly adjacent the inner ends of said teeth, said structure being provided with cutting blades travelling in superimposed relation over said teeth, and means driven from said traction wheel and operatively engaging with said part for revolving said structure, said means including a sprocket wheel carried by the traction wheel and a power transmitting element leading from the sprocket wheel to said part.

GEORGE B. RANDOLPH.